United States Patent [19]

Holecek et al.

[11] 4,139,358
[45] Feb. 13, 1979

[54] METHOD OF FORMING A VESSEL WITH POURING LIP

[75] Inventors: Rudolph Holecek, Souppes sur Loing; Paul Mouchikhine, Saint-Pierre les Nemours; Serge A. Renault, Montigny-sur-Loing, all of France

[73] Assignee: Corning Glass Works, Corning, N.Y.

[21] Appl. No.: 852,214

[22] Filed: Nov. 17, 1977

[30] Foreign Application Priority Data

Jun. 28, 1977 [FR] France .................... 77 19754

[51] Int. Cl.² .................... C03B 9/14; C03B 11/00
[52] U.S. Cl. .................... 65/68; 65/76; 65/305; 65/306; 65/307
[58] Field of Search .................... 65/68, 76, 305, 306, 65/307

[56] References Cited

U.S. PATENT DOCUMENTS

| 75577 | 3/1868 | Ripley | 65/305 |
|---|---|---|---|
| 90,040 | 5/1869 | Young | 65/305 |
| 163,539 | 5/1875 | Smith | 65/68 |
| 975,409 | 11/1910 | Fry | 65/305 |
| 1,601,836 | 10/1926 | Stenhouse | 65/306 X |
| 1,627,884 | 5/1927 | Bristol | 65/305 X |

*Primary Examiner*—S. Leon Bashore
*Assistant Examiner*—Frank W. Miga
*Attorney, Agent, or Firm*—Burton R. Turner; Clarence R. Patty, Jr.

[57] ABSTRACT

Glass or glass-ceramic vessels are formed with a pouring lip wherein wall portions of the vessel below the lip are of a thinner construction than the remaining wall portions so as to impede glass flow to the lip area and facilitate uniform glass flow to upper portions of the vessel during the forming process.

4 Claims, 11 Drawing Figures

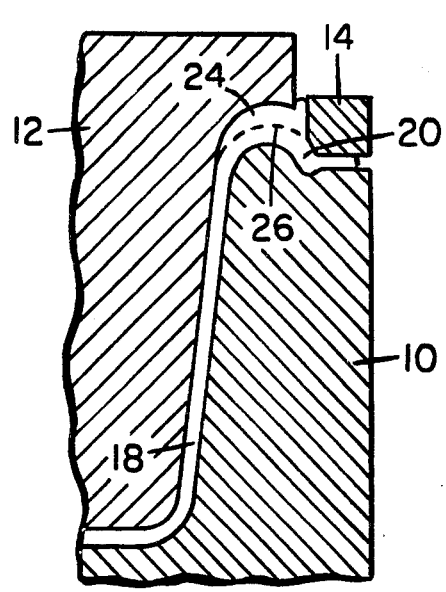
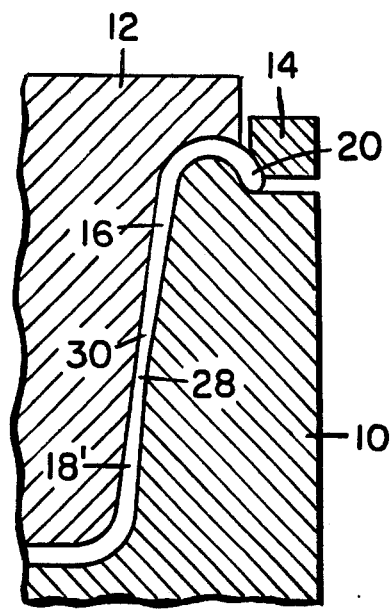
Fig. 4a   Fig. 4b
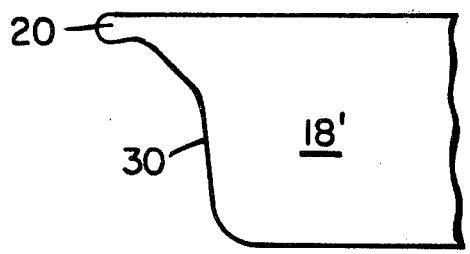
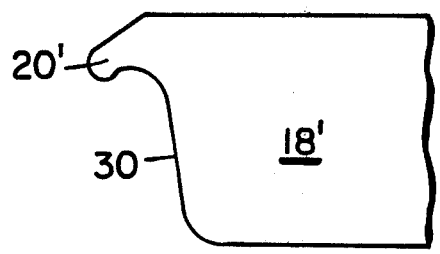
Fig. 5a   Fig. 5b

METHOD OF FORMING A VESSEL WITH POURING LIP

BACKGROUND OF THE INVENTION

The invention is directed to the press-forming of glass articles having lip areas from molten glass. Conventionally, the method of press-forming articles from molten glass or glass-ceramic materials includes the use of a mold for forming the outer surfaces of the article, a plunger for forming the inner surfaces thereof, and a mold ring which limits the upper movement of the glass between the mold and the plunger and forms an upper edge on the article. In practice, a small amount of glass or glass-ceramic, called a gob, is first deposited in the bottom of the mold and with the mold ring in position, the plunger is moved downwardly within the mold thus forcing the gob of semimolten glass upwardly within the cavity formed therebetween to the limits of the mold ring, and thus form a pressed article.

In the case of articles which are essentially symmetrical or have a shape generated by surface of revolution, the molten glass arrives in contact with the mold ring substantially simultaneously about the upper edge of the article. However, when forming very asymmetrical articles such as a casserole with an integral handle as shown in FIGS. 2a and 2b, various problems arise with regard to both the forming of the lip portion and the simultaneous distribution of glass to the mold ring. That is, if the lip is not formed correctly, an unsightly fin is produced adjacent its inner edge, and when the glass distribution to the upper edge of an asymmetrical vessel is not correctly programmed, either an extended portion on such vessel will be poorly completed due to a shortage of material, or the lip will be defective because of excess material. Such excess material, if it arrives at the lip portion while still in a flowable condition will produce excessive fins, whereas if such glass became solidified during forming, the pressure of the plunger wound tend to crack the lip making the articles unuseable.

Accordingly, the present invention has overcome the problems of producing fins on lip portions and incomplete filling during the pressing of asymmetrical articles by not only offsetting the area in which the fin will be formed, but also by programming the distribution of molten glass to the upper edge of the article so as to uniformly fill the mold cavity and distribute glass to the upper edge portions of the article formed therein.

SUMMARY OF THE INVENTION

In its simplest form, the present invention is directed to a method of press-forming articles from molten glass in such a manner so that during the pressing operation molten glass flows upwardly within the mold cavity in a distributive manner so as to substantially simultaneously uniformly fill the upper reaches of the mold cavity adjacent the mold ring. In practicing the invention, a glass or glass-ceramic article is produced having a pouring lip and substantially uniform wall portions. However, a wall portion below the pouring lip is reduced in thickness during the forming operation from that of the remaining wall portions.

In order to produce a pouring lip having an asethetic appearance and no unsightly fins adjacent the inner edge thereof, it is preferred to form the upper part of the lip with the plunger, rather than the mold ring as is commonly done. Further, the cavity formed between the mold and the plunger is provided with a restricted area below the portion forming the lip, so as to restrict the flow of molten glass into the lip area and facilitate the distribution of molten glass uniformly about the vessel adjacent the mold ring. Thus, after a gob of molten glass or glass-ceramic material is positioned in the bottom of the mold, the plunger is moved downwardly within the mold to cause the glass or glass-ceramic material to flow upwardly within the cavity formed between the plunger and the mold so that it substantially simultaneously reaches the upper extent thereof adjacent the mold ring, with the restricted zone or area below the pouring lip preventing excess material from being delivered to such lip area.

It thus has been an object of the present invention to provide a method of press-forming glass or glass-ceramic articles having substantially uniform upper edge portions provided with a pouring lip, such that the resulting article is completely formed about its upper extent without excess material adjacent the pouring lip area.

BRIEF DESCRIPTION OF THE DRAWINGS

FIG. 2b is a top plan view of the article shown in FIG. 2a;

FIG. 3b is a fragmental schematic plan view of a lip formed by the apparatus of FIG. 3a;

FIG. 4a is a fragmental schematic view in section illustrating the disadvantages of the usual procedure for forming a lip on an asymmetrical article;

FIG. 4b is a fragmental schematic elevational view similar to FIG. 4a but illustrating one method of carrying out the present invention;

FIG. 5a is a fragmental elevational view of a vessel having a pouring lip in the plane of the upper edge thereof; and FIG. 5b is a fragmental elevational view of a vessel having a pouring lip below the plane of the upper edge of such vessel.

DESCRIPTION OF THE PREFERRED EMBODIMENTS

Figure 1:
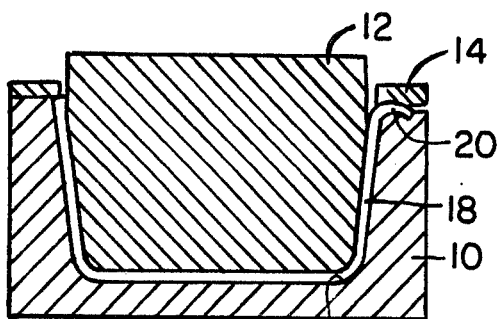
FIG. 1 is a schematic sectional view of a mold arrangement for press-forming articles from glass or other similar material.

Referring now to FIG. 1, apparatus commonly utilized for press-forming glass articles is shown including a mold 10, a plunger 12 and a mold ring 14 providing a cavity 16 therebetween. A vessel 18 is shown formed therein with a lip portion 20. When forming symmetrical articles with the apparatus shown in FIG. 1, molten glass deposited as a gob within the mold uniformly reaches the upper extent of the mold cavity adjacent the mold ring so as to substantially simultaneously form the upper periphery of the article. However, when very asymmetrical articles are formed, such as the handled casserole vessel 18' having a lip portion 20 and an integral handle 22, various problems are encountered.

Figure 3A:
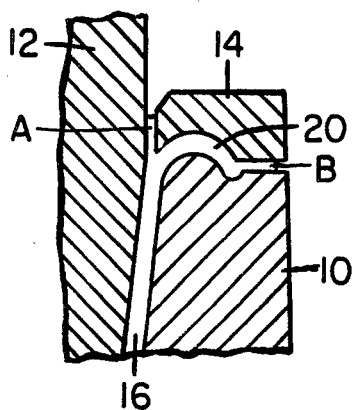
FIG. 3a is a fragmental sectional schematic view illustrating one method of forming a lip portion on an article.
Figure 3B:
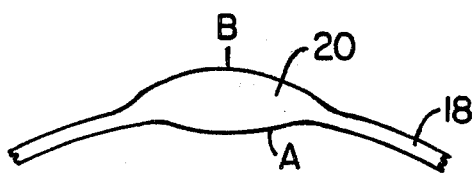

The lip 20, formed in the upper edge of the vessel may be a source of one of the problems, depending upon its method of formation. As shown in FIG. 3a, the shape of the lip portion 20 is determined entirely by the mold 10 and mold ring 14, since the lip is formed outwardly of the plunger 12. Accordingly, an undesirable fin A is formed on the inner edge of the lip 20 between the mold ring 14 and the plunger 12, which is opposed to the fin B which tends to form by the flow of glass between the mold 10 and the mold ring 14. FIG. 3b illustrates the resulting lip 20 formed by the apparatus of FIG. 3a, which is unacceptable especially from an asethetic point of view.

Figure 3C:
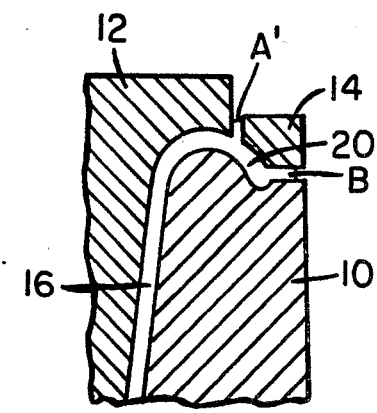
FIG. 3c is a fragmental schematic sectional view of a further method of forming a lip on an article.
Figure 3D:
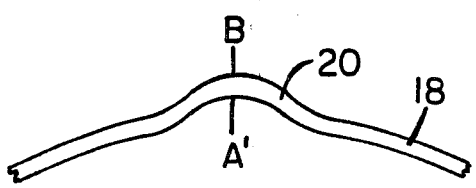
FIG. 3d is a fragmental schematic plan view of a lip formed by the apparatus of FIG. 3c.

Referring now to FIG. 3c, a modified mold set is shown wherein the lip 20 of the article formed in the cavity 16 has a portion of its upper surface formed by the plunger 12, so as to transpose the fin toward an outer edge of lip 20. Accordingly, the resulting fins A' and B may be eliminated by standard fire polishing techniques, wherein the edge of the vessel is resoftened and the fins A' and B are fused into the upper edge of the vessel in an asethetic manner. The fragmental view shown in FIG. 3d represents the lip formed by the apparatus of FIG. 3c after the article has been fire polished and the fins fused into the upper edge of the vessel.

The method of forming vessels with pouring lips as shown in FIG. 3c, wherein the upper surface of the pouring lip is formed by the plunger and the resulting fin is moved outwardly toward the outer edge, functions very satisfactorily when press-forming substantially symmetrical vessels, since the glass uniformly flows upwardly so as to reach the upper peripheral extent of the vessel substantially simultaneously. However, when forming an extremely asymmetric article such as the casserole 18', shown in FIGS. 2a and 2b, having lip portion 20 and an integral handle 22 extending therefrom, it is virtually impossible to satisfactorily form both the lip and the handle utilizing the procedure and apparatus shown in FIG. 3c. That is, as the plunger 12 descends upon the charge of molten glass positioned within the mold 10, the glass flows upwardly and contacts the mold ring 14 adjacent the lip portion 20 prior to the flow of the molten glass filling the handle portion 22 of the vessel 18'. Accordingly, either the lip 20 is correctly formed and the handle 22 is poorly completed due to a shortage of glass to fill the handle cavity, or the handle 22 is correctly formed and the lip 20 is defective due to excess material.

Referring now to FIG. 4a, excess material 24 is shown being trapped between the lip-forming surface of the plunger 12 and the mold 10 during the forming operation. When the molten glass solidifies during the forming operation, it becomes fragile and the downward movement exerted by the plunger 12 on such surplus material 24 has a tendency to produce cracks and checks 26 in the lip portion 20, thus rendering the article unusable. However, when the molten glass is still in a plastic condition upon reaching the lip area 20, such excess glass is forced into the openings between the mold ring 14, mold 10, and plunger 12, thus producing excessive ridges upon the continued downward descent of the plunger, resulting in an unacceptable fragile lip portion 20. Although the method of forming the lip as shown in FIG. 3a does not exert a crushing force on excess material during continued downward descent, as is occassioned with the method shown in FIG. 4a, the method shown in FIG. 3a is also unacceptable since extremely large and unaesthetic fins A are produced with such excess material.

Figure 2A:
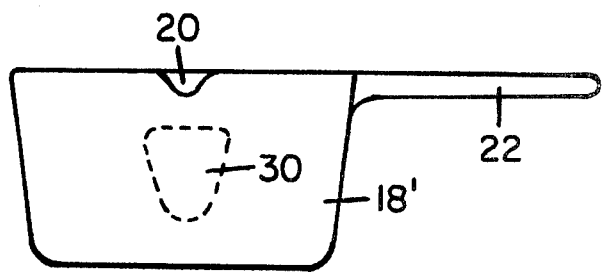
FIG. 2a is a side elevational view of an asymmetric glass article having an integral handle and a pouring lip.
Figure 2B:
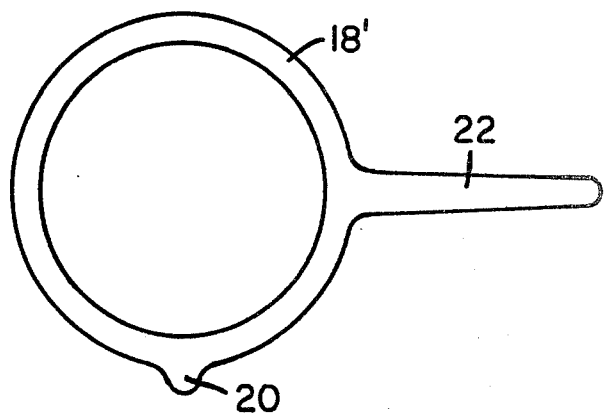

FIG. 4b illustrates an embodiment of the present invention wherein a vessel is formed having both an aesthetic lip portion and complete filling of an asymmetric portion. As shown in FIG. 4b, a restricted area 28 is formed within the cavity 16 below the lip portion 20 so as to restrict or retard the flow of glass upwardly to the lip portion 20. The restricted area 28 may be located about 25 millimeters below the upper level of the pouring lip 20, and results in a significant decrease in the thickness of the wall portion 30 of the article 18' formed by the molding apparatus. As shown in FIGS. 4b and 2a, the restricted area 28, which produces the thinned or decreased wall thickness 30 in the vessel 18', includes an area between the upper and lower extent of the vessel which extends at least the width of the pouring lip 20. Smaller areas than those shown in FIG. 2a may be utilized depending upon the article being formed and the fluidity of the glass being utilized. In other words, the construction in glass flow provided by the restriction 28 may be positioned and dimensioned as desired to provide the appropriate retardation of flow, depending upon the operating parameters, without mechanically weakening the article.

As shown particularly in FIG. 4b, the restriction 28 gradually increases from the bottom of the cavity wall upwardly toward the lip portion, up to an area of maximum restriction (minimum wall thickness) and then gradually decreases up toward the top edge of the lip portion. In other words, the resulting wall of the article 18' is of normal thickness in the impact areas near the base of the article and up at the lip area of the article, so as to give good resistance to breakage. The constricted area, or area of retarded flow 28 producing the thin wall portions 30 is located centrally of the wall portion and is protected with respect to most lateral mechanical blows coming from outside of the direction of the lip portion 20. As shown in both FIGS. 5a and 5b, the area 30 is protected by the lip portion of the vessel 18', whether the lip portion 20 be in the plane of the upper periphery of the vessel 18' or whether the lip portion 20' be at an offset or lower level from the upper periphery of the vessel 18'.

As shown in FIG. 4b, the restricted area 28 may be formed by bowing the inner surface of the mold 10 to reduce the thickness of the cavity 16 in such area, or the outer surface of the plunger 12 may be so bowed to reduce the thickness of the cavity 16. Further, it is possible to provide the cavity walls of both the mold and plunger with a bowed portion in order to produce the desired restriction within the cavity.

Thus, by impeding the upward flow of material in desired areas during forming, it is possible to distribute the flow so that a substantially uniform complete filling of the mold cavity is produced, providing an aesthetically acceptable and mechanically sound article. It will be apparent, however, that each type of thermal plastic material, whether it be molten glass or a glass-ceramic, and each article shape, will require different sizes and shapes of restriction zones so as to impede the flow of material and produce a desired distribution.

Although the now preferred embodiments of the invention have been disclosed, it will be apparent to those skilled in the art that various changes and modifications may be made thereto without departing from the spirit and scope thereof as defined in the appended claims.

We claim:

1. A method of press-forming glass and glass ceramic materials into an article having a pouring lip projecting outwardly from an upper extent thereof wherein the material is distributed during pressing so as to uniformly form the upper extent of the article comprising, supplying molten material to be formed to a mold cavity having an outwardly projecting lip-forming portion, flowing such material upwardly within the mold cavity, restricting the upward flow of such material below said lip-forming portion to reduce the thickness of a wall portion of said article below said pouring lip relative to remaining wall portions thereof, and continuing the upward flow of such material so that such material substantially uniformly fills the upper extent of said mold cavity including said lip-forming portion while providing the proper amount of molten material to remaining portions of said upper extent.

2. A method of press-forming an article as defined in claim 1 including the steps of restricting the flow of molten material below the lip-forming portion of the cavity relative to flow in remaining portions of said cavity by reducing the thickness of the cavity in an area forming wall portions of said article below the lip-forming portion relative to the thickness of the cavity forming the remaining wall portions.

3. A method of press-forming an article as defined in claim 2 including the steps of reducing the thickness of the cavity below the lip-forming portion by bowing at least one cavity wall portion inwardly of said cavity relative to adjacent cavity wall portions to provide a constriction for restricting material flow therewithin.

4. A method of press-forming an article as defined in claim 1 including the steps of providing a plunger having a portion cooperable with the lip-forming portion of said mold, press-forming the article within a cavity between said mold and plunger, and press-forming an upper surface portion of the lip with the plunger during the forming of the article.

* * * * *